United States Patent
Burns et al.

(10) Patent No.: US 9,625,196 B2
(45) Date of Patent: Apr. 18, 2017

(54) SYSTEM AND METHOD FOR CONTROLLING OF VAPOR COMPRESSION SYSTEM

(71) Applicant: Mitsubishi Electric Research Laboratories, Inc., Cambridge, MA (US)

(72) Inventors: Dan Burns, Wakefield, MA (US); Neera Jain, Libertyville, IL (US); Christopher Laughman, Waltham, MA (US); Stefano Di Cairano, Somerville, MA (US); Scott Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 408 days.

(21) Appl. No.: 14/299,296

(22) Filed: Jun. 9, 2014

(65) Prior Publication Data
US 2015/0354877 A1 Dec. 10, 2015

(51) Int. Cl.
*F25B 49/02* (2006.01)
*G05B 13/00* (2006.01)
*F25B 13/00* (2006.01)

(52) U.S. Cl.
CPC .............. *F25B 49/02* (2013.01); *G05B 13/00* (2013.01); *F25B 13/00* (2013.01);
(Continued)

(58) Field of Classification Search
CPC F25B 49/02; F25B 13/00; F25B 2313/02741; F25B 2500/05; F25B 2500/19; F24F 11/00; G05B 13/00
(Continued)

(56) References Cited

U.S. PATENT DOCUMENTS

| 7,905,103 B2 | 3/2011 | Larsen et al. |
| 8,694,131 B2 * | 4/2014 | Burns ............... F25B 49/02 236/49.3 |

(Continued)

OTHER PUBLICATIONS

Wallace et al. "Offset-free model predictive control of a vapor compression cycle." Journal of Process Control 22 (2012) p. 1374-1386.

*Primary Examiner* — Marc Norman
(74) *Attorney, Agent, or Firm* — Gene Vinokur; James McAleenan; Hironori Tsukamoto

(57) ABSTRACT

A method for controlling an operation of a vapor compression system (VCS) determines values of measured outputs of the operation of the VCS that include performance and constrained outputs. The method determines states of the VCS using an estimator model of the VCS defining a relationship between the states of the VCS, control inputs and controlled outputs, such that a difference between outputs predicted using the estimator model and the measured outputs asymptotically approaches zero. The states of the VCS include a main state representing the operation of the VCS and an auxiliary state representing the effect of unknown disturbances on each measured output of the VCS. The control inputs for controlling the operation of the VCS are determined using a prediction model, such that the constrained output satisfies the constraints, and a difference between the performance output and the value of the setpoint asymptotically approaches zero.

19 Claims, 9 Drawing Sheets

(52) U.S. Cl.
CPC . *F25B 2313/02741* (2013.01); *F25B 2500/05* (2013.01); *F25B 2500/19* (2013.01)

(58) Field of Classification Search
USPC .......... 62/125, 126, 127, 129; 700/276, 277
See application file for complete search history.

(56) References Cited

U.S. PATENT DOCUMENTS

| | | | |
|---|---|---|---|
| 8,793,003 B2* | 7/2014 | Laughman | F25B 49/02 |
| | | | 62/215 |
| 8,825,184 B2* | 9/2014 | Burns | F25B 5/02 |
| | | | 236/49.3 |
| 2015/0253051 A1* | 9/2015 | Jin | F25B 49/02 |
| | | | 62/56 |
| 2016/0147203 A1* | 5/2016 | Di Cairano | G05B 13/042 |
| | | | 700/30 |

* cited by examiner

SYSTEM AND METHOD FOR CONTROLLING OF VAPOR COMPRESSION SYSTEM

FIELD OF THE INVENTION

This invention relates generally to vapor compression systems, and more particularly to controlling operations of a vapor compression system subject to constraints.

BACKGROUND OF THE INVENTION

Vapor compression systems (VCS), e.g., as air conditioners or heat pumps, are multivariable systems whose primary objective is to move a quantity of heat from, e.g., a low temperature environment to a high temperature environment in order to regulate the temperature of an indoor space. A controller for the VCS selects control values such that the measured room temperature is driven to the setpoint room temperature, and as a result, the cooling or heating energy provided by the VCS is indirectly matched to the heating or cooling load, referred herein as a thermal load.

Various conventional methods for controlling the VCS determine the required control inputs to regulate the temperatures without measuring the thermal load. This is because the VCS is installed in different environments and operates under different conditions for which it is impossible or at least impractical to measure or even estimate the thermal load. Thus, the conventional control methods consider the thermal load as an unmeasured disturbance that is rejected by a feedback controller.

Conventional feedback controllers control the VCS reactively, i.e., by reacting to a change in a state of the VCS. In contrast, a forward control method controls the system predictively, i.e., predicting the state of the controlled system and generating the control values based on that prediction. However, the formulation of the forward control methods requires an accurate prediction of all disturbances on the controlled system. Because the thermal load cannot be predicted or accurately estimated, the application of the forward control methods to the VCSs is problematic.

Therefore, feedback controllers, such as proportional-integral (PI) type controllers, are currently the most common type of controllers for controlling the operation of the VCSs, see, e.g., EP 2402662 A1 and U.S. Pat. No. 5,077,983. In the PI controllers, each individual control input is used to control a specific system output to a desired value. This means that for a multivariable system, the control designer is forced to specify individual input-output pairings for each PI controller. Such individual controllers can reduce the optimality of the joint operation of various components of the VCS.

During the operation of the VCS, various constraints should be enforced. For example, certain maximum or minimum temperatures and pressures should not be violated for equipment safety. The feedback controllers enforce constraints reactively, i.e., corrective action is taken once a dangerous situation is detected. The violations of the constraints can occur for some period of time while the system responds with corrective actions, and therefore the threshold at which corrective action is used is selected conservatively to account for violations that can occur. As a result, the feedback controllers with reactive constraint management logic are often detuned away from the value of the constraints, which sacrifice the regions of highest performance, see, e.g., EP2469201.

Accordingly, there is a need in the art for a system and a method for an efficient control of vapor compression system subject to constraints.

SUMMARY OF THE INVENTION

It is an object of present invention to provide a system and a method for controlling an operation of a vapor compression system (VCS) such that thermal load requirements of the operation are met, and a performance of the system is optimized.

It is further object of the invention to provide such a system and a method that controls the vapor compression system predictively such that constraints on the operation of the VCS are satisfied.

For example, a model predictive control (MPC) is based on an iterative, finite horizon optimization of a cost function that describes the operation of the controlled system and has the ability to anticipate future events to take appropriate control actions. Some embodiments of the invention are based on recognition that MPC offers attractive properties for vapor compression system control including guaranteed enforcement of constraints, which in turn can be selected for more aggressive performance because the constraint enforcement is guaranteed. However, the MPC requires an accurate prediction of all disturbances on the VCS. Because the thermal load cannot be predicted or accurately estimated, the application of the MPC to the VCSs is problematic.

It is further recognized, that MPC requires an estimate of the state of the vapor compression system during its operation. Unfortunately, the complexity and cost of modern VCS make direct measurement of the state impractical. Therefore, the MPC of the VCS requires a method for estimating the states of the VCS under control, which generally requires measurements or estimation of a thermal load disturbance on the VCS. However, the thermal load is a dominant disturbance of the VCS that can be neither directly measured, nor accurately predicted.

Some embodiments of the invention are based on the realization that an estimator that prioritizes state estimate accuracy is not necessary. Rather than combine noisy measurement information with uncertain model information to obtain an accurate state estimate, it is realized that if an estimator can be formulated in a way that prioritizes output accuracy over state estimate accuracy, the need for measuring thermal load disturbances and obtaining accurate models of its influence on other signals can be avoided.

Specifically, in the context of the VCS, the need to measure or predict the thermal load disturbance can be avoided entirely by constructing a state estimator so that the difference between the predicted output and the measured output asymptotically approaches zero even in the presence of unmeasurable disturbances and model uncertainty. This prevents inaccuracies in the prediction model and ensures that the control inputs determined by the controller achieve the control objectives of the VCS.

For example, the state estimator can be formulated to include main states that account for empirical input-output behavior, plus states that account for the mismatch between measured outputs and predicted outputs. In this formulation, the estimator includes main physical states and non-physical auxiliary states that drive estimator output to the measured output. The purpose of this estimator is to drive the predicted outputs to their measured values. Therefore, these auxiliary states represent the influence of all external sources of error, including the unmeasured thermal load disturbance, not otherwise accounted for in the main states.

Because the influence of the thermal load is accounted for in non-physical auxiliary states in the estimator, there is no need to directly measure or model the thermal load. In this approach, the benefits of constraint enforcement and increased performance characteristics of model predictive control of vapor compression systems can be realized.

Accordingly, one embodiment of the invention discloses a method for controlling an operation of a vapor compression system (VCS). The method includes determining, in response to receiving at least one value of a setpoint, values of measured outputs of the operation of the VCS, the measured outputs including at least one performance output controlled according to the value of the setpoint and at least one constrained output controlled to satisfy constraints independent from the value of the setpoint; determining states of the VCS using an estimator model of the VCS defining a relationship between the states of the VCS, control inputs and controlled outputs, such that a difference between outputs predicted using the estimator model and the measured outputs asymptotically approaches zero, wherein the states of the VCS include a main state representing the operation of the VCS and an auxiliary state representing the effect of unknown disturbances on each measured output of the VCS; and determining control inputs for controlling the operation of the VCS using a prediction model defining a relationship between the states of the VCS, the control inputs, the performance and constrained outputs, and the value of the setpoint, such that the constrained output satisfies the constraints, and a difference between the performance output and the value of the setpoint asymptotically approaches zero. The steps of the method are performed by a processor.

Another embodiment discloses a controller for controlling an operation of a vapor compression system (VCS). The controller includes an estimator for determining iteratively states of the VCS, such that a difference between outputs of the operation of the VCS predicted using the states and measured outputs of the operation of the VCS asymptotically approaches zero; and a predictive controller for determining control inputs for the operation of the VCS using the states of the VCS.

Yet another embodiment discloses a vapor compression system (VCS) including a set of components for controlling an environment according to a value of a setpoint, the set of components includes a compressor having a variable speed for compressing and pumping a refrigerant; an expansion valve for providing an adjustable pressure drop between a high-pressure and a low-pressure portions of the VCS; and a heat exchanger having a variable speed fan for adjusting an air-flow rate through the heat exchanger. The VCS also includes a sensor for determining values of measured outputs of an operation of the VCS, the measured outputs including at least one performance output controlled according to the value of the setpoint and at least one constrained output controlled to satisfy constraints independent from the value of the setpoint; and a controller for controlling an operation of at least some of the components of the VCS. The controller includes an estimator for determining iteratively states of the VCS, such that a difference between outputs of the operation of the VCS predicted using the states and the measured outputs of the operation of the VCS asymptotically approaches zero; and a predictive controller for determining control inputs for the operation of at least some of the components of the VCS.

DEFINITIONS

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "control system" or a "controller" refer to a device or a set of devices to manage, command, direct or regulate the behavior of other devices or systems. The control system can include one or several modules.

A "vapor compression system" refers to a system that uses the vapor compression cycle to move refrigerant through components of the system based on principles of thermodynamics, fluid mechanics, and/or heat transfer.

An "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

"Components of a vapor compression system" refer to any components of the vapor compression system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor-compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor-compression system.

"Set of control signals" refers to specific values of the inputs for controlling the operation of the components of the vapor compression system. The set of control signals includes, but are not limited to, values of the speed of the compressor, the position of the expansion valve, the speed of the fan in the evaporator, and the speed of the fan in the condenser.

A "setpoint" refers to a target value the system, such as the vapor compression system, aims to reach and maintain as a result of the operation. The term setpoint can be applied to any particular value of a specific set of control signals and thermodynamic and environmental parameters.

"Measured outputs" refers to signals that can be measured using sensors in the machine (e.g. room air temperature).

"Control input" refers to a signal that can be manipulated by the controller (e.g. compressor frequency).

A "performance output" refers to a signal that belongs to the set of measured outputs that is controlled to reach a specified setpoint value.

A "constrained output" refers to a signal that belongs to the set of measured outputs that is controlled to satisfy a constraint, e.g., to stay within upper and lower bounds.

A "measured disturbance" refers to a signal affecting a state of the system that may not be controlled but that can be modeled or measured, e.g. the outdoor air temperature.

A "prediction horizon" refers to the length of time (measured in number of discrete time intervals) over which the operation of the system is predicted for determining the optimal sequence of control inputs.

DETAILED DESCRIPTION OF EMBODIMENTS OF INVENTION

It is an object of the present invention to provide a system and a method for controlling an operation of a vapor compression system (VCS) such that performance of the system is optimized while rejecting unmeasurable disturbances such as thermal loads acting on the VCS. It is further object of the invention to provide such a system and a method that controls the vapor compression system predictively such that constraints on the operation of the VCS are satisfied.

Figure 1:
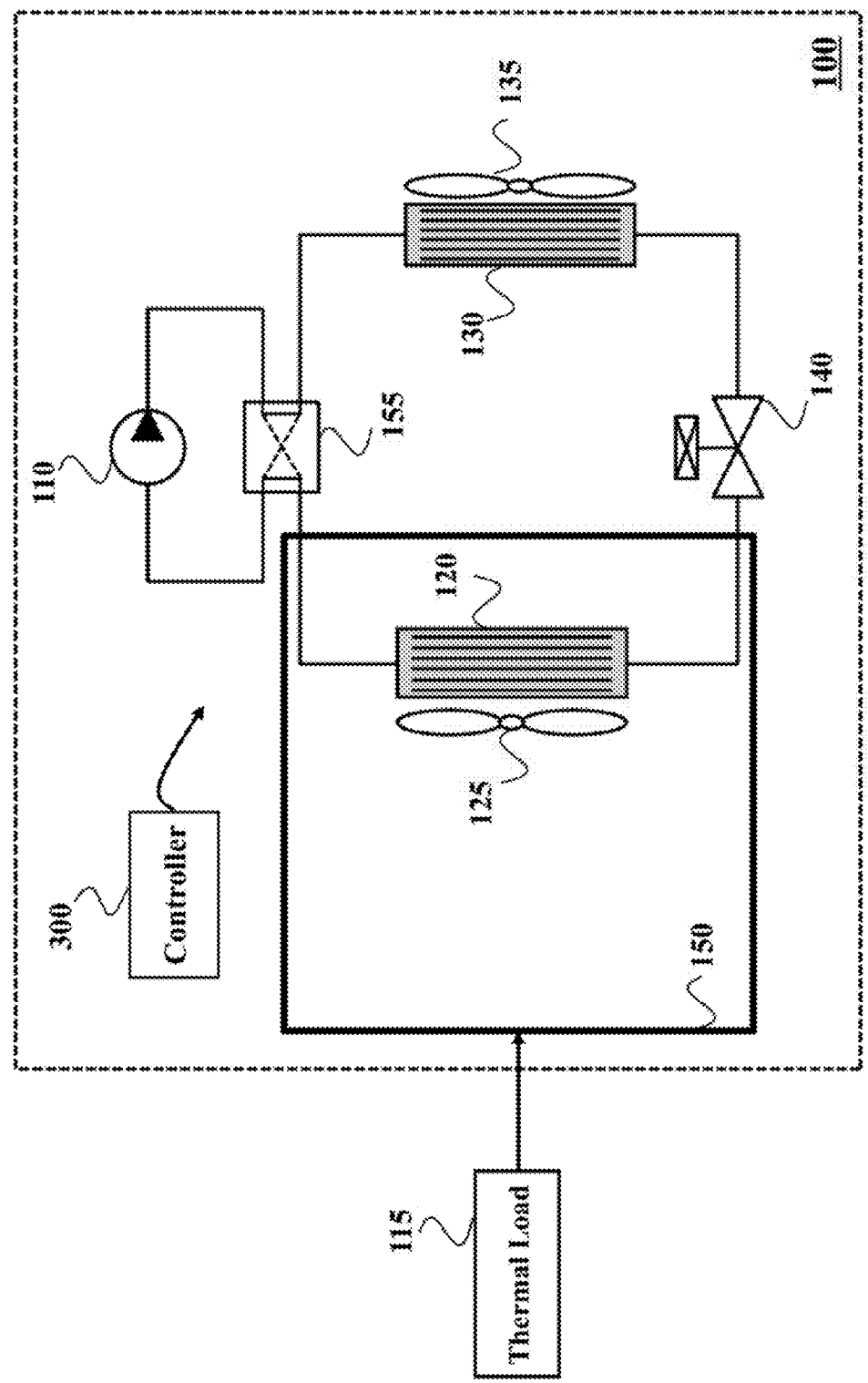
FIG. 1 is a block diagram of components of a vapor compression system controlled according to some embodiments of the invention.

FIG. 1 shows a schematic of a vapor compression system 100 controlled by a controller 300 according to some embodiments of the invention. The controller 300 includes a predictive controller, such as a controller implementing a model predictive control (MPC). The components of the VCS 100 can include an indoor heat exchanger 120 located in an indoor space or zone 150, an outdoor unit heat exchanger 130 located in the ambient environment, a compressor 110 and an expansion valve 140. A thermal load 115 acts on the indoor space or zone 150.

Additionally, the VCS 100 can include a flow reversing valve 155 that is used to direct high pressure refrigerant exiting the compressor to either the outdoor unit heat exchanger or the indoor unit heat exchanger, and direct low pressure refrigerant returning from either the indoor unit heat exchanger or outdoor unit heat exchanger to the inlet of the compressor. In the case where high pressure refrigerant is directed to the outdoor unit heat exchanger, the outdoor unit heat exchanger acts as a condenser and the indoor unit acts as an evaporator, wherein the system rejects heat from the zone to the ambient environment, which is operationally referred to as "cooling mode." Conversely, in the case where the high pressure refrigerant is directed to the indoor unit heat exchanger, the indoor unit heat exchanger acts as a condenser and the outdoor unit heat exchanger acts as an evaporator, extracting heat from the ambient environment and pumping this heat into the zone, which is operationally referred to as "heating mode."

Figure 2:
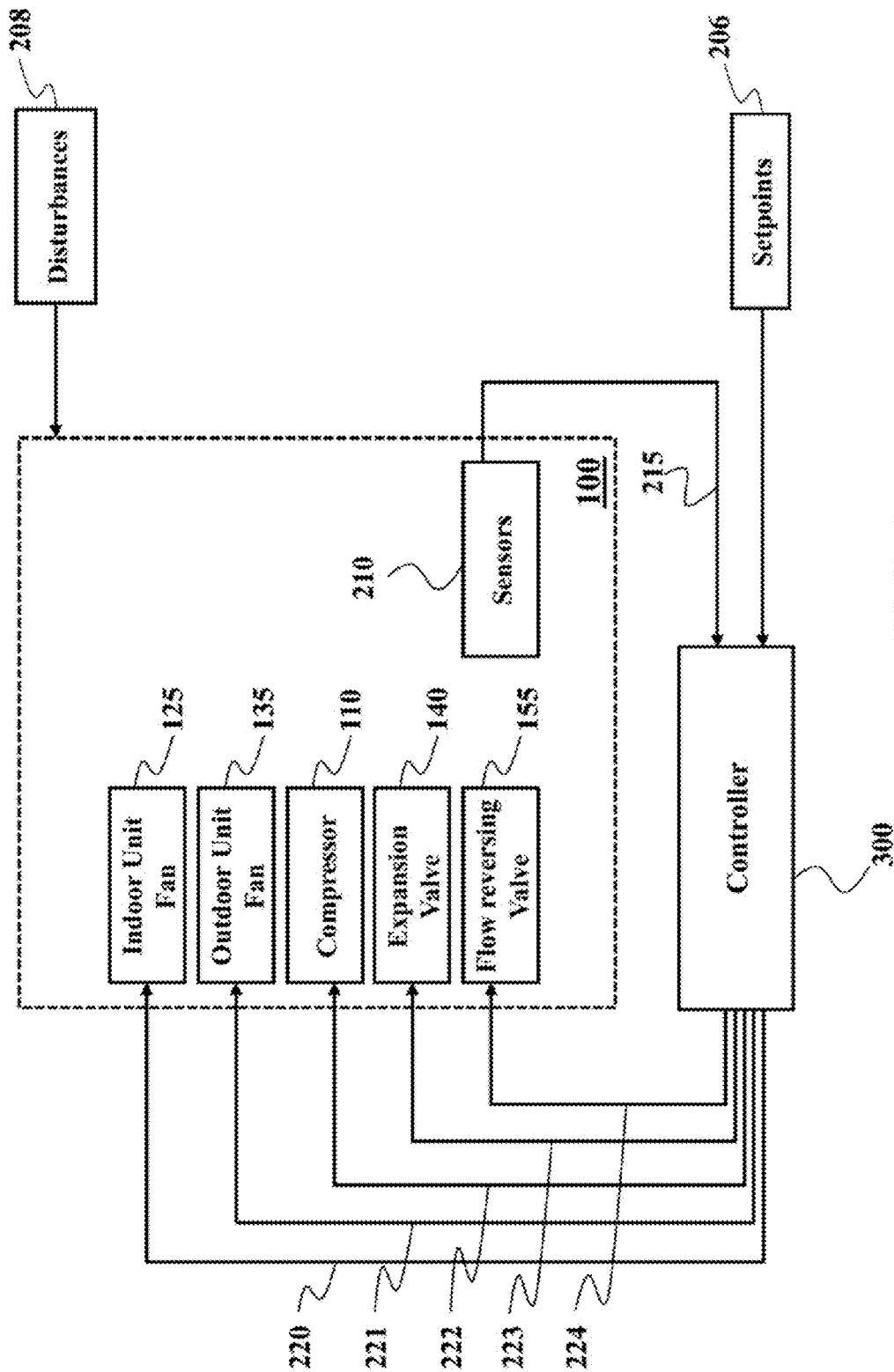
FIG. 2 is a block diagram of an exemplary set of actuators of the vapor compression system of FIG. 1.

FIG. 2 shows an example of the configuration of signals, sensors, and controller used in the VCS 100. A controller 300 reads information from sensors 210 configured to measure various temperatures, pressures, flow rates or other information about the operation of the system, including measurable disturbances such as the ambient air temperature. The controller can be provided with setpoints 206 that represent desired values of measured signals of the process such as a desired zone temperature. Setpoint information can come from a thermostat, wireless remote control, or internal memory or storage media. The controller then computes control inputs such that some measured outputs are driven to their setpoints. These control inputs can include an indoor unit fan speed 220, an outdoor unit fan speed 221, a compressor rotational speed 222, an expansion valve position 223, and a flow reversing valve position 224. In this manner, the controller controls operation of the vapor compression system such that the setpoint values are achieved in the presence of disturbances 208, such as a thermal load, acting on the system.

Figure 3:
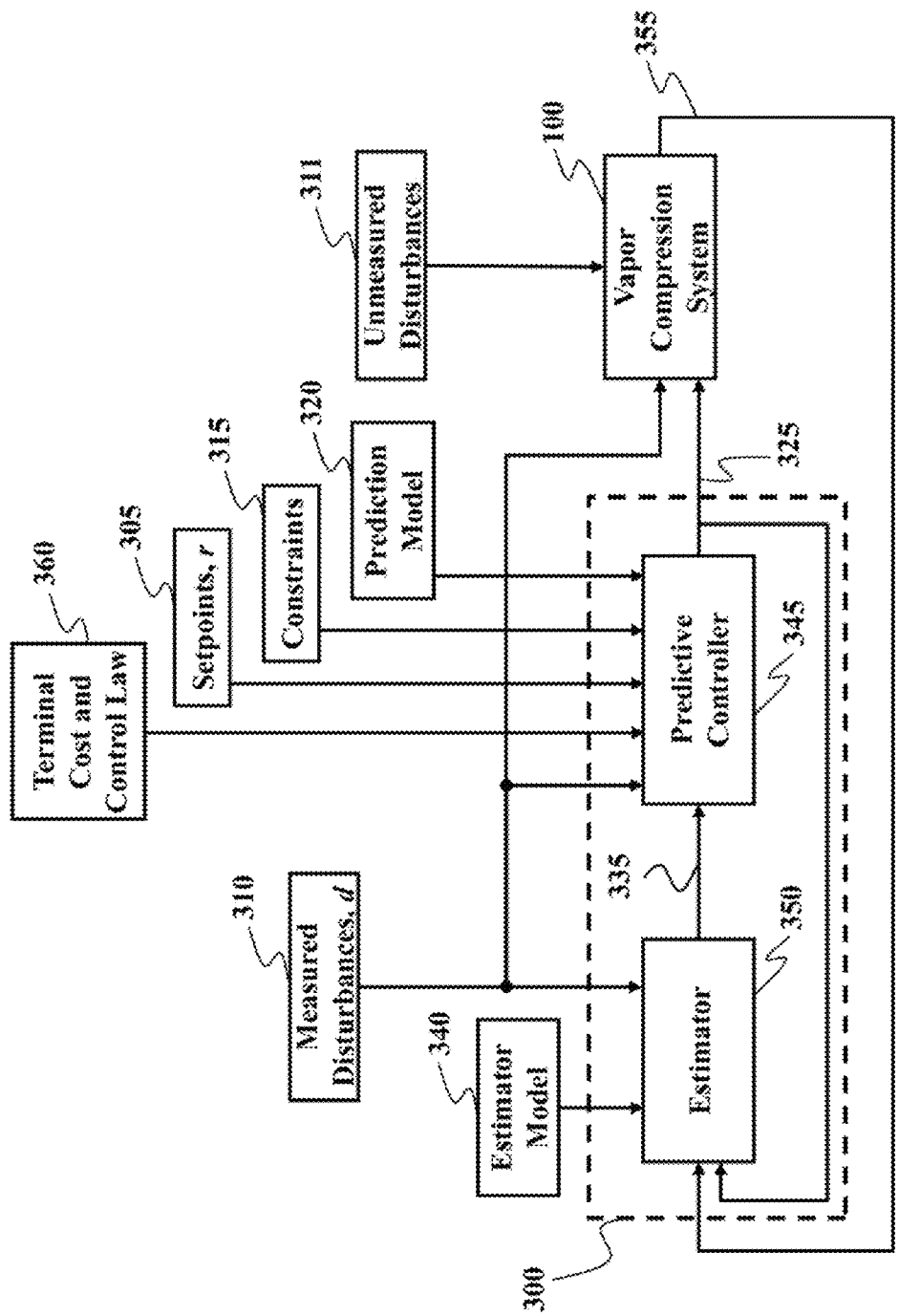
FIG. 3 is a block diagram of a controller including an estimator and a predictive controller according to some embodiments of the invention.

FIG. 3 shows an operative diagram of the controller 300. The controller 300 includes an estimator 350 that generates an estimate of the state 335 of the system 100 according to the measured outputs 355 of the system, the control inputs 325 to the system, an estimator model 340, and, optionally, measured disturbances 310, such that the difference between the predicted output and the measured output is driven to zero in the presence of unmeasured disturbances acting on the system.

The values of the measured outputs of the operation of the VCS can be determined in response to receiving at least one value of a setpoint, e.g., a desired temperature in the controlled space. In some embodiments, the measured outputs include at least one performance output controlled according to the value of the setpoint and at least one constrained output controlled to satisfy constraints independent from the value of the setpoint.

For example, the performance outputs can include one or combination of a temperature of an air in a controlled space, and a discharge temperature of a compressor. The constrained outputs can include one or combination of a discharge temperature of a compressor, a discharge superheat temperature of the compressor, a temperature of an evaporator coil, and a temperature of the condenser coil. Considering the constrained output as part of the measured outputs allows ensuring the satisfaction of the constraints 315.

The estimator 350 takes advantage of the iterative nature of the predictive control and updates the state of the system iteratively and/or concurrently with the determination of the control signal. For example, a current value of the state can be determined based on the previous value of the state and an error between the output of the VCS predicted based on the previous value of the state and the measured output of the system. For example, the state can be determined iteratively at each estimation time interval, and the control inputs can be determined at each control time interval. In one embodiment the estimation time interval is less than or equal to the control time interval. In this way, the estimated state converges to the true state regardless of the noise.

The predictive controller 345 determines the optimal control inputs 325 for the VCS 100 by solving an optimization problem defined by a prediction model 320, the input and/or output constraints 315 on the operation of the system, a terminal cost and control law 360, the measured disturbances 310, setpoints for the performance outputs 305, and the estimated system state 335. The constraints 315 represent physical and operational limitations of the system. The prediction model is defined so that the resulting cost function has a minimum at zero, and the design of the terminal cost and terminal control law guarantee locally asymptotically stable behavior of the tracking error between the performance outputs and their corresponding setpoints.

For example, one embodiment of the invention uses the following continuous time linear time-invariant model of a vapor compression system (VCS):

$$\dot{x}(t) = Ax(t) + [B \ B_d]\begin{bmatrix} u(t) \\ d(t) \end{bmatrix}, \quad (1)$$

$$y_m(t) = Cx(t)$$

where x are the dynamic states, y are the measured outputs, u are the controlled inputs, d are the measured disturbances, and A, B, Bd, and C are parameters of the model of the system.

Offset-Free Estimation of States

Some embodiments of the invention are based on recognition that by designing an estimator which drives the error between the predicted outputs and measured outputs to zero when unmeasured disturbances 311, e.g. the thermal load, are affecting the system operation, a model predictive controller that uses the output of this estimator can achieve offset-free regulation of the performance outputs and also guarantee enforcement of output constraints. In various embodiments, the estimator 350 uses auxiliary states to capture the effect of unmeasured disturbances 311 and model uncertainty on the system.

Figure 4A:
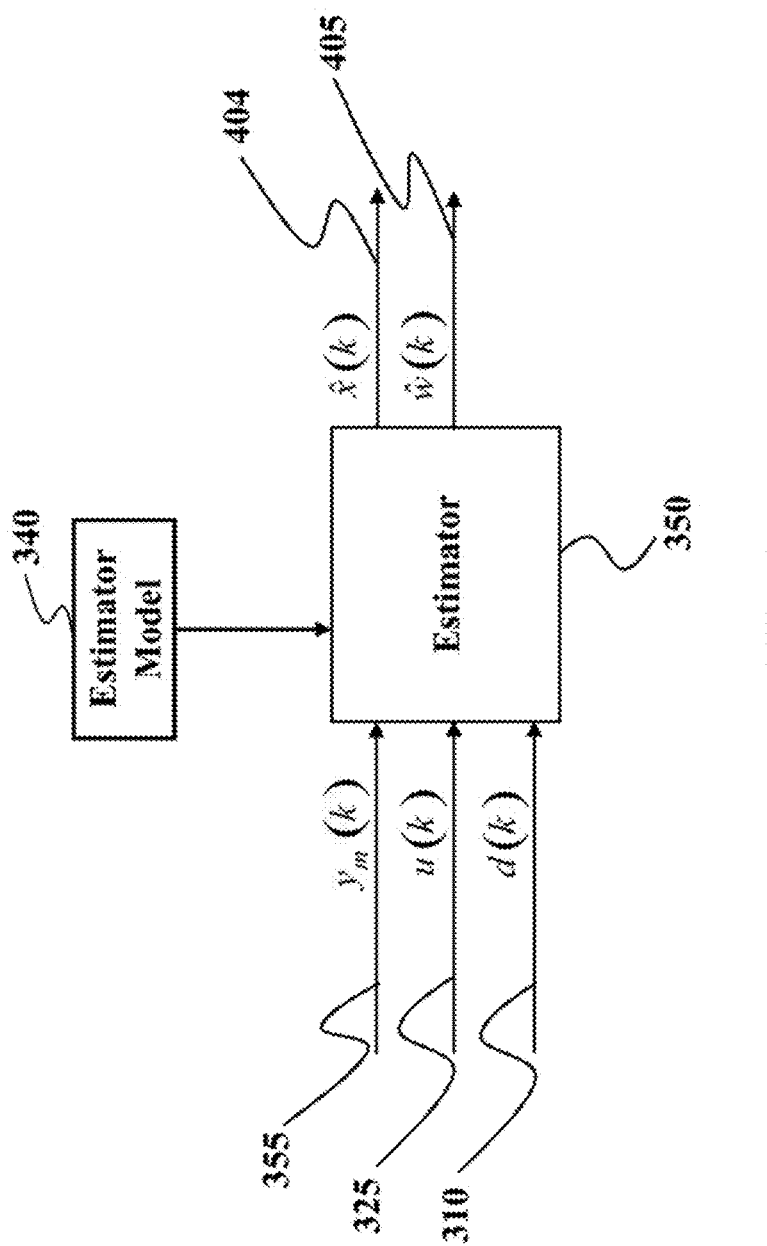
FIG. 4A is a schematic of input and output signals of the estimator of the controller according to some embodiments of the invention.

FIG. 4A shows a diagram of the estimator 350, which takes as inputs the measured outputs 355, the control inputs 325 to the system, an estimator model 340, and, optionally, the measured disturbances 310 and produces an estimate of the states of the VCS include a main state 404 representing the operation of the VCS and an auxiliary state 405 representing the effect of unknown disturbances on each measured output of the VCS.

Some embodiments provide the estimator 350 by determining an estimator relationship between the control inputs, the measured disturbances, the measured outputs, and the main dynamic states of the VCS. The estimator relationship can be determined empirically according to experimental data or analytically according to principles of physics. Next, the embodiment augments the estimator relationship with p auxiliary states to produce the estimator model, wherein p is a number of the measured outputs, and wherein the auxiliary states represent an aggregate effect of the unknown disturbances and uncertainties on the measured outputs at a steady operating condition of the VCS.

For example, one embodiment discretizes the VCS model (1) with a sample time of $Ts_e$, resulting in (2).

$$x(k+1) = A_e x(k) + B_e u(k) + B_{d,e} d(k)$$

$$y_m(k) = C_e x(k) \quad (2)$$

The estimator model (2) is augmented with auxiliary states, $w \in \square^{p \times 1}$ where p is the number of measured outputs in the system. For example, this augmented estimator model can take the form:

$$\begin{bmatrix} x(k+1) \\ w(k+1) \end{bmatrix} = \begin{bmatrix} A_e & 0 \\ 0 & I \end{bmatrix}\begin{bmatrix} x(k) \\ w(k) \end{bmatrix} + \begin{bmatrix} B_e \\ 0 \end{bmatrix} u(k) + \begin{bmatrix} B_{d,e} \\ 0 \end{bmatrix} d(k), \quad (3)$$

$$y_m(k) = [C_e \ I]\begin{bmatrix} x(k) \\ w(k) \end{bmatrix},$$

where the auxiliary states are constants added to each measured output.

The dynamics of the estimator are given by $$\begin{bmatrix} \hat{x}(k+1) \\ \hat{w}(k+1) \end{bmatrix} = \begin{bmatrix} A_e & 0 \\ 0 & I \end{bmatrix}\begin{bmatrix} \hat{x}(k) \\ \hat{w}(k) \end{bmatrix} + \quad (4)$$

$$\begin{bmatrix} B_e \\ 0 \end{bmatrix} u(k) + \begin{bmatrix} B_{d,e} \\ 0 \end{bmatrix} d(k) + \begin{bmatrix} L_{e1} \\ L_{e2} \end{bmatrix}(y_m(k) - \hat{y}_m(k))$$

$$\hat{y}_m(k) = [C_e \ I]\begin{bmatrix} \hat{x}(k) \\ \hat{w}(k) \end{bmatrix}$$

where $$L_e = \begin{bmatrix} L_{e1} \\ L_{e2} \end{bmatrix}$$

is the estimator gain.

Some embodiments determine the estimator gain L using the estimator model so that the time-based performance of the closed-loop estimator is guaranteed to be stable. The estimator gain can be designed in a variety of ways, e.g., using Kalman filter or Luenberger observer design techniques.

Figure 4B:
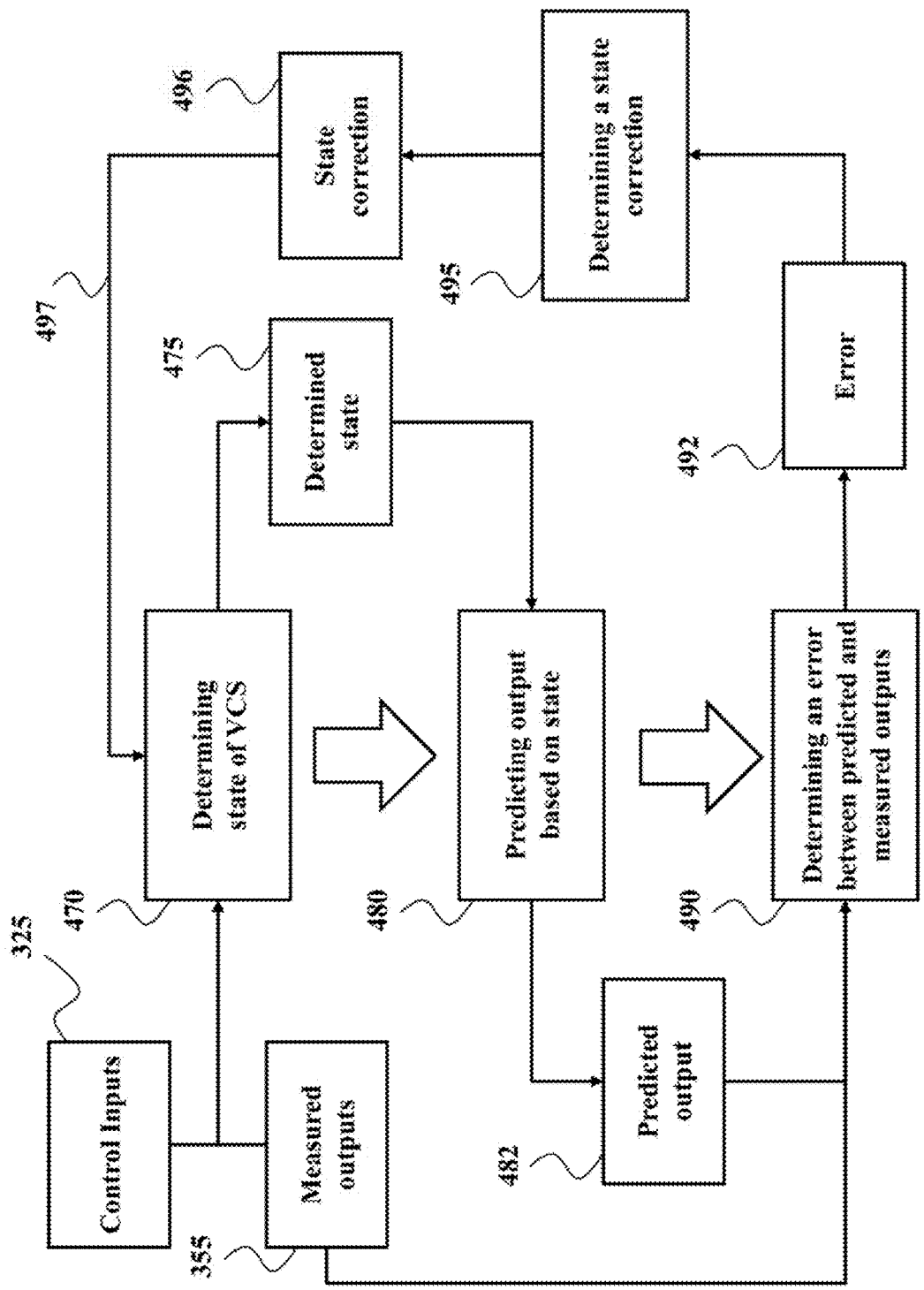
FIG. 4B is a block diagram of a method performed by the estimator for determining the state of the vapor compression system according to some embodiment of the invention.

FIG. 4B shows a block diagram of a method for determining the states by the estimator 350 for a current time step of the control according to one embodiment of the invention. The method determines 470 the states 475 of the VCS based on the control inputs 325 and the measured outputs 355 determined for a previous time step of the control, and predicts 480 outputs 482 of the VCS using the state 475 and the estimator model 350. The method determines 490 an error 492 between the predicted 482 and the measured 355 outputs of the VCS, and determines 495 a state correction 496 according to the error.

The state correction is mathematically described by the term $$\begin{bmatrix} L_{e1} \\ L_{e2} \end{bmatrix}(y_m(k) - \hat{y}_m(k))$$

in (4). The error 492 is scaled by the estimator gain $L_e$ to determine 495 the state correction 496. This quantity is then added to the predicted state based on the estimator model shown in Equation (3). The method updates 497 the states of the VCS with the state correction. This step of the method 496 can be performed once or repeated several times within the current time step of the control.

Figure 4C:
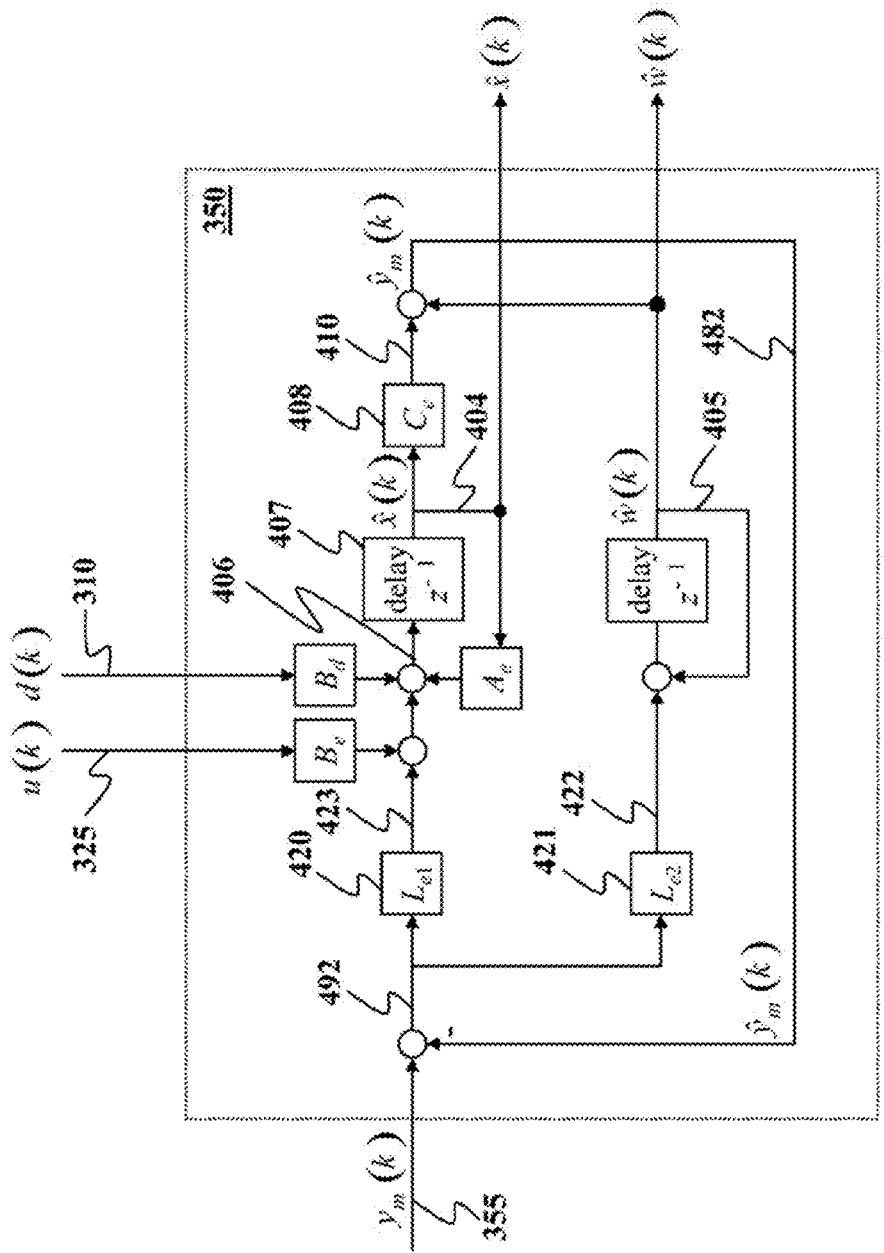
FIG. 4C is a block diagram of the estimator according to some embodiment of the invention.

FIG. 4C shows a diagram of the estimator 350 according to one embodiment of the invention. Discrete-time measurements of the control input 325, the measured disturbance 310, and the current physical state estimate 404, are obtained and used to evaluate Equation (3) to estimate of the physical state at the next time step 406. This estimate is corrected 423 with the error 492 between the measured output 355 and the estimated output 482 weighted by the estimator gain $L_{e1}$ 420. The state estimate for the next time step 406 is then delayed by one time step 407, resulting in the physical state estimate at the current time step 404. The physical state estimate 404 is scaled by the output matrix $C_e$ 408 resulting in the predicted output 410.

In one embodiment, the error 492 is multiplied by the estimator gain $L_{e2}$ 421 to determine the state correction 422 for the auxiliary state estimate 405. The estimated auxiliary state 405 is added to the predicted output 410, and their sum, the estimated output, 482, is compared against the measured output 355. The physical and auxiliary state estimates 404 and 405 reach a constant value once the difference between the estimated output 482 and the measured output 355 is zero.

Model Predictive Control Problem

In some embodiments, the predictive controller 345 is the model predictive controller. The MPC is based on an iterative, finite horizon optimization of a model of a controlled system and has the ability to anticipate the evolution of VCS outputs into some horizon into the future and take appropriate control actions. This is achieved by optimizing the operation of the system over a future finite time-horizon subject to constraints, and implementing the control over the current timeslot.

For example, the constraints can represent physical limitation of the performance of the system and safety limitations on the operation of the system. For example, at time t the current state of the machine is estimated and an admissible cost minimizing control strategy is determined for a relatively short time horizon in the future. Specifically, an online or on-the-fly calculation determines a cost-minimizing control strategy until time t+T, where T represents the length of the finite horizon. Typically, only the first step of the control strategy is implemented, then the state is estimated again and the calculations are repeated starting from the now current state, yielding a new control inputs. The prediction horizon is shifted forward and for this reason MPC is also called receding horizon control.

Figure 5:
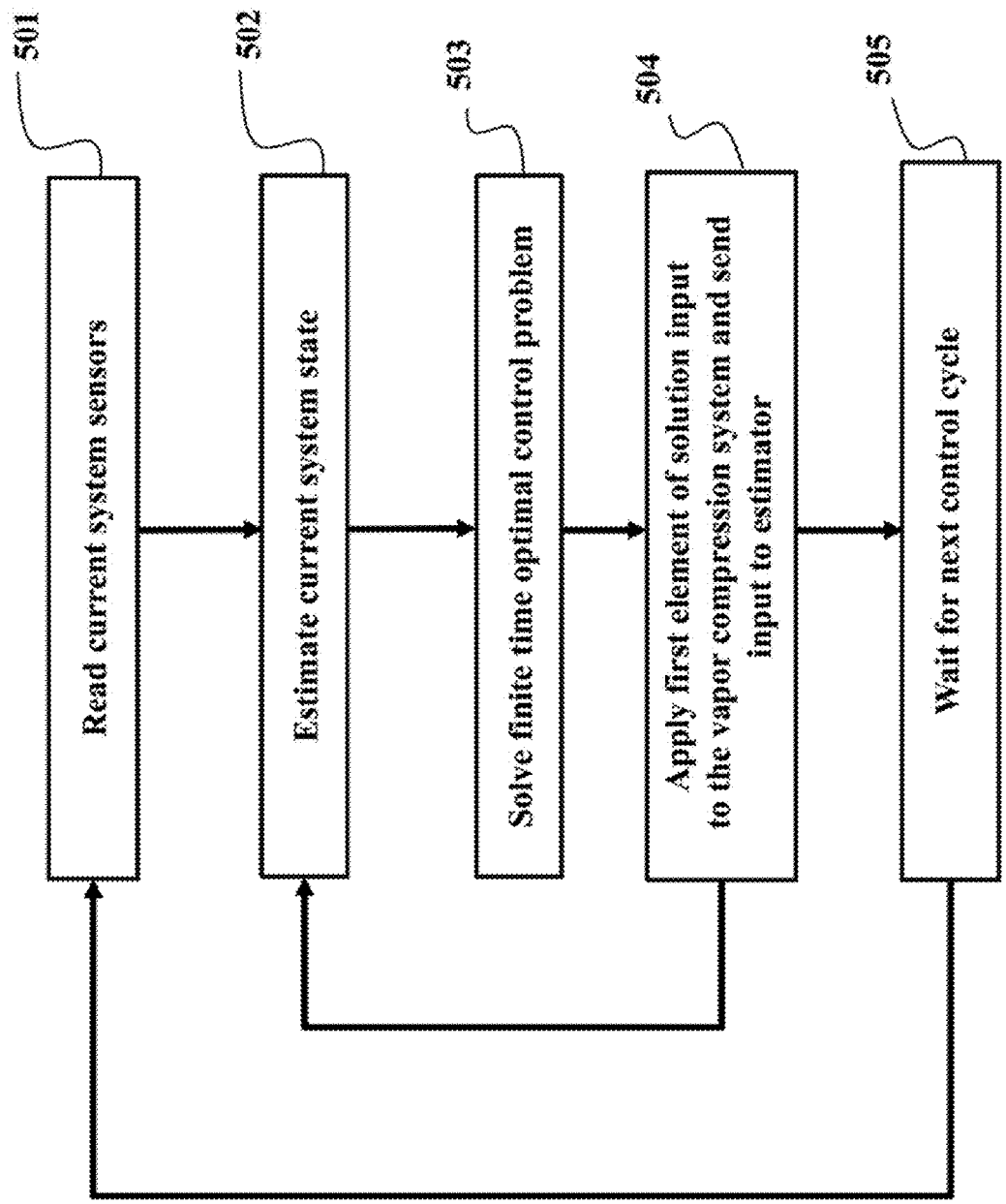
FIG. 5 is a flow chart of a method for model predictive control according to one embodiment of the invention.

FIG. 5 shows a flow chart of a method for model predictive control of the VCS according to one embodiment of the invention. The embodiments determined 501 the measured outputs, e.g., receives information from the sensors of the VCS and estimates 502 the state of the VCS using the estimator 350. Next, the controller 345 solves 503 the constrained finite time optimal control problem and applies 504 first element of solution input to the vapor compression system. The embodiment also sends the control inputs to the estimator 350 and transitions 505 to the next control cycle.

Some embodiments formulate the MPC in a special way to guarantee that system constraints on both the control inputs and measured outputs are satisfied. This formulation requires i) a particular formulation of the prediction model and ii) the design of a terminal cost and control law so that the model predictive controller tracking error is locally asymptotically stable. Furthermore, the design of the terminal cost and control law should not require that the number of control inputs is equal to the number of performance inputs. In fact, in some embodiments, the number of control inputs greater than the number of performance inputs. The extra degree(s) of freedom that are available allow performance (zero steady-state error tracking performance) to be maintained even when system constraints are active.

Formulating the Prediction Model

A prediction model for the VCS operation is a set of equations that describe how the measured outputs change over time as functions of current and previous inputs, and previous measured outputs. The state of the VCS is any set of information, in general time-varying, that, together with a model of the VCS and future inputs, can uniquely define the future motion of the machine.

Figure 6:
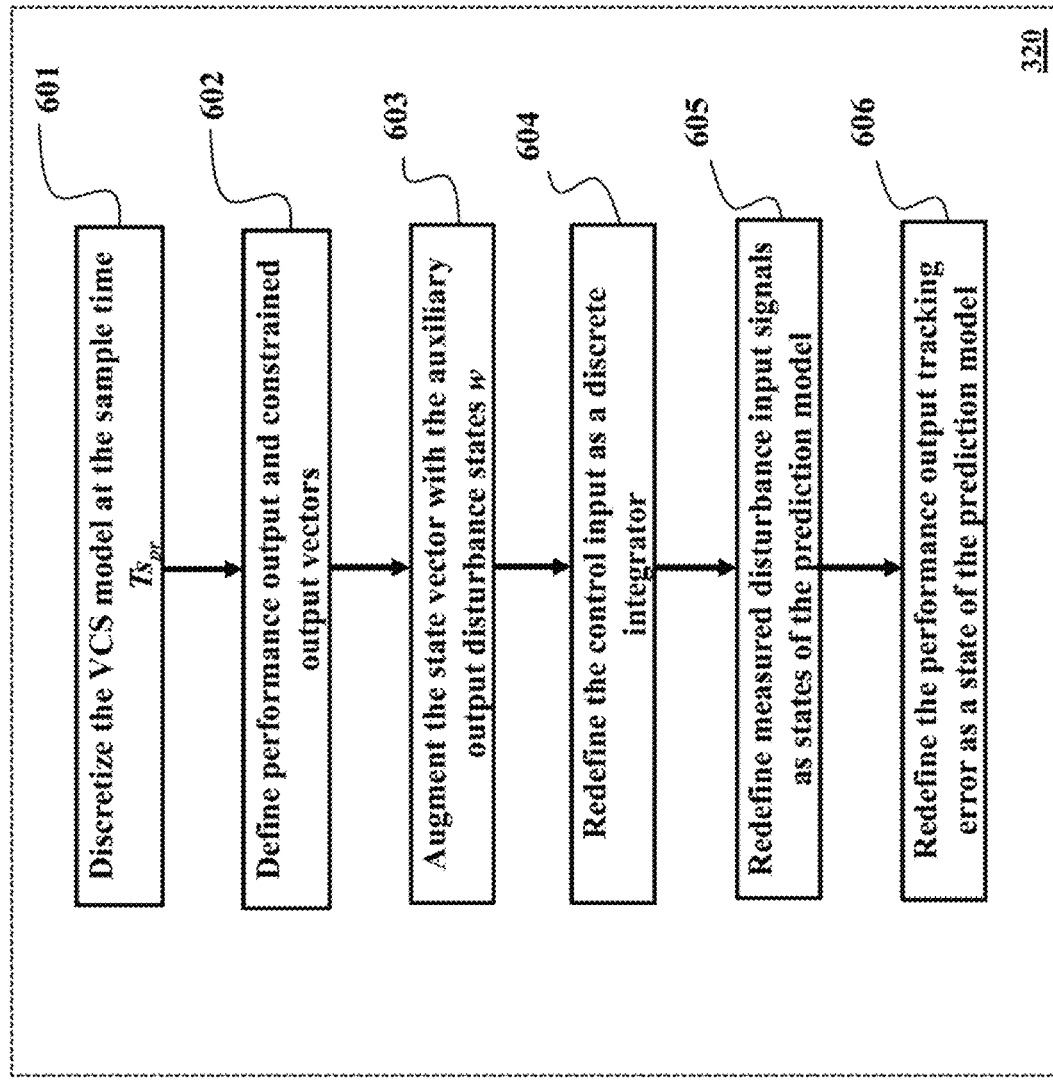
FIG. 6 is a flow chart of a method for creating a prediction model according to some embodiments of the invention.

FIG. 6 shows a block diagram of a method for creating the prediction model according to some embodiments of the invention. For the MPC, a discrete-time model of the system dynamics is used to predict the system response over the chosen prediction horizon, N. The basic state space representation of the prediction model, shown in Equation (5), is based on Equation (1) and discretized 601 with a sample time of $Ts_{pr}$ where $Ts_{pr} \geq Ts_e$.

$$x(k+1) = A_{pr}x(k) + B_{pr}u(k) + B_{d,pr}d(k)$$

$$y_c(k) = C_{pr}x(k)$$

$$y_p(k) = E_{pr}x(k) \quad (5)$$

Two (potentially overlapping) subsets of the measured outputs $y_m$ 355 are defined 602 to include the constrained outputs $y_c$ and the performance outputs $y_p$. The constrained output matrix, $C_{pr}$, contains those rows of C such that $y_c$ describes the outputs to be constrained in the MPC formulation. Similarly, the performance output matrix $E_{pr}$ contains those rows of C such that $y_p$ describes the performance outputs that are explicitly characterized in the MPC cost function.

Some embodiments augment the prediction model (5) so that the resulting MPC problem can be solved as a quadratic program. First, the prediction model is augmented with the same auxiliary (output disturbance) states 603, w, that were added to the estimator model so that the prediction model accurately predicts the effect of control decisions on the constrained and performance outputs, $$\begin{bmatrix} x(k+1) \\ w(k+1) \end{bmatrix} = \begin{bmatrix} A_{pr} & 0 \\ 0 & I \end{bmatrix} \begin{bmatrix} x(k) \\ w(k) \end{bmatrix} + \begin{bmatrix} B_{pr} \\ 0 \end{bmatrix} u(k) + \begin{bmatrix} B_{d,pr} \\ 0 \end{bmatrix} d(k) \quad (6)$$

$$y_c(k) = \begin{bmatrix} C_{pr} & C_w \end{bmatrix} \begin{bmatrix} x(k) \\ w(k) \end{bmatrix}$$

$$y_p(k) = \begin{bmatrix} E_{pr} & E_w \end{bmatrix} \begin{bmatrix} x(k) \\ w(k) \end{bmatrix}$$

where $C_w$ and $E_w$ are matrices of zeros and ones defined to be consistent with the definition of $y_c$, $y_p$, and w. The inclusion of w provides the information to the prediction model about effect of the unmeasured disturbances on the performance of the system.

The second augmentation involves expressing the input as a discrete integrator 604. Let $u(k)=u(k-1)+du(k)$. This change of variables enables constraints to be placed on the rate of change of the control input. It also results in cost function whose minimum is zero. Let $x_u(k)=u(k-1)$ and $\bar{u}=du(t)$. Additionally, because constraints could be imposed on the value of the actual control input (for example maximum or minimum actuator limits), $u(k-1)$, in addition to the change in the control input from one time step to another (for example, actuator rate limits), $\bar{u}(k)$, we augment the constrained output vector, $y_c$, with $y_u=x_u$ as shown in (7).

$$\begin{bmatrix} x(k+1) \\ w(k+1) \\ x_u(k+1) \end{bmatrix} = \begin{bmatrix} A_{pr} & 0 & B_{pr} \\ 0 & I & 0 \\ 0 & 0 & I \end{bmatrix} \begin{bmatrix} x(k) \\ w(k) \\ x_u(k) \end{bmatrix} + \begin{bmatrix} B_{pr} \\ 0 \\ I \end{bmatrix} \bar{u}(k) + \begin{bmatrix} B_{d,pr} \\ 0 \\ 0 \end{bmatrix} d(k) \quad (7)$$

$$\begin{bmatrix} y_c(k) \\ y_u(k) \end{bmatrix} = \begin{bmatrix} C_{pr} & C_w & 0 \\ 0 & 0 & I \end{bmatrix} \begin{bmatrix} x(k) \\ w(k) \\ x_u(k) \end{bmatrix}$$

$$y_p(k) = \begin{bmatrix} E_{pr} & E_w & 0 \end{bmatrix} \begin{bmatrix} x(k) \\ w(k) \\ x_u(k) \end{bmatrix}$$

Next, the state representation is augmented 605 with the measured disturbance signals 310. In one embodiment, let $d(k+1)=d(k)$ (i.e., the disturbance is assumed constant over the prediction horizon) and $x_d(k)=d(k)$. Then $$\begin{bmatrix} x(k+1) \\ w(k+1) \\ x_u(k+1) \\ x_d(k+1) \end{bmatrix} = \begin{bmatrix} A_{pr} & 0 & B_{pr} & B_{d,pr} \\ 0 & I & 0 & 0 \\ 0 & 0 & I & 0 \\ 0 & 0 & 0 & I \end{bmatrix} \begin{bmatrix} x(k) \\ w(k) \\ x_u(k) \\ x_d(k) \end{bmatrix} + \begin{bmatrix} B_{pr} \\ 0 \\ I \\ 0 \end{bmatrix} \bar{u}(k) + \begin{bmatrix} B_{d,pr} \\ 0 \\ 0 \\ 0 \end{bmatrix} d(k) \quad (8)$$

$$\begin{bmatrix} y_c(k) \\ y_u(k) \end{bmatrix} = \begin{bmatrix} C_{pr} & C_w & 0 & 0 \\ 0 & 0 & I & 0 \end{bmatrix} \begin{bmatrix} x(k) \\ w(k) \\ x_u(k) \\ x_d(k) \end{bmatrix}$$

$$y_p(k) = \begin{bmatrix} E_{pr} & E_w & 0 & 0 \end{bmatrix} \begin{bmatrix} x(k) \\ w(k) \\ x_u(k) \\ x_d(k) \end{bmatrix}$$

In addition, the state space representation is also augmented 606 with the reference signal(s), or setpoints that are regulated during the control. In general, the references are exogenous signals such as setpoints from a thermostat and in one embodiment, the references are constant over the prediction horizon, i.e., $r(k+1)=r(k)$.

$$\begin{bmatrix} x(k+1) \\ w(k+1) \\ x_u(k+1) \\ x_d(k+1) \\ x_r(k+1) \end{bmatrix} = \begin{bmatrix} A_{pr} & 0 & B_{pr} & B_{d,pr} & 0 \\ 0 & I & 0 & 0 & 0 \\ 0 & 0 & I & 0 & 0 \\ 0 & 0 & 0 & I & 0 \\ 0 & 0 & 0 & 0 & I \end{bmatrix} \begin{bmatrix} x(k) \\ w(k) \\ x_u(k) \\ x_d(k) \\ x_r(k) \end{bmatrix} + \begin{bmatrix} B_{pr} \\ 0 \\ I \\ 0 \\ 0 \end{bmatrix} \bar{u}(k) + \begin{bmatrix} B_{d,pr} \\ 0 \\ 0 \\ 0 \\ 0 \end{bmatrix} d(k), \quad (9)$$

$$\begin{bmatrix} y_c(k) \\ y_u(k) \end{bmatrix} = \begin{bmatrix} C_{pr} & C_w & 0 & 0 & 0 \\ 0 & 0 & I & 0 & 0 \end{bmatrix} \begin{bmatrix} x(k) \\ w(k) \\ x_u(k) \\ x_d(k) \\ x_r(k) \end{bmatrix},$$

$$z(k) = \begin{bmatrix} E_{pr} & E_w & 0 & 0 & -I \end{bmatrix} \begin{bmatrix} x(k) \\ w(k) \\ x_u(k) \\ x_d(k) \\ x_r(k) \end{bmatrix},$$

where $z(k) = y_p(k) - r(k)$ and $x_r(k) = r(k)$.

In some embodiments, the prediction model can be rewritten in the following form:

$$\begin{bmatrix} \xi(k+1) \\ r(k+1) \end{bmatrix} = \begin{bmatrix} A_\xi & 0 \\ 0 & A_r \end{bmatrix} \begin{bmatrix} \xi(k) \\ r(k) \end{bmatrix} + \begin{bmatrix} B_\xi \\ 0 \end{bmatrix} \bar{u}(k), \quad (10)$$

$$\bar{y}(k) = \begin{bmatrix} C_\xi & 0 \end{bmatrix} \begin{bmatrix} \xi(k) \\ r(k) \end{bmatrix},$$

$$\bar{z}(k) = \begin{bmatrix} E_\xi & -E_r \end{bmatrix} \begin{bmatrix} \xi(k) \\ r(k) \end{bmatrix},$$

where $\xi(k) = [x(k)' \ w(k)' \ x_u(k)' \ x_d(k)']'$, $r(k) = x_r(k)$, and $\bar{z}(k) = z(k)$.

Determining the Terminal Cost and Control Law

Figure 7:
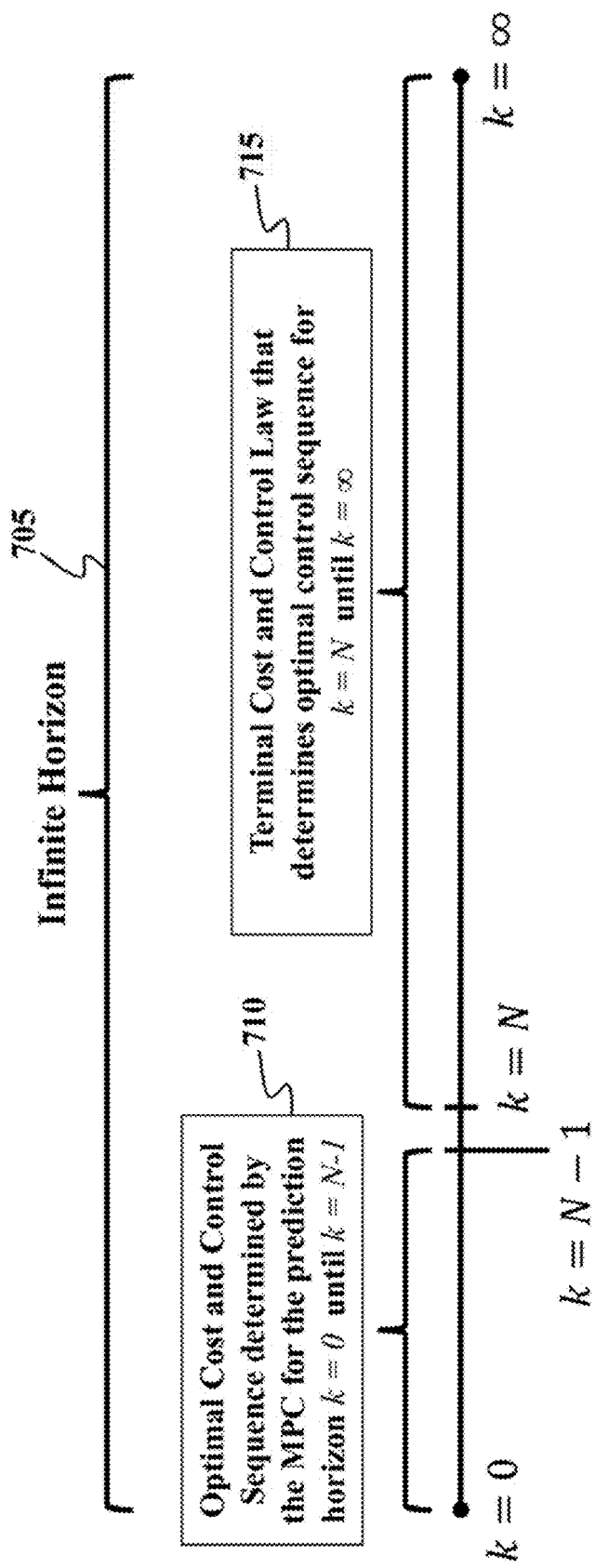
FIG. 7 is a schematic of the relationship between a terminal cost and control law and the optimal cost and control sequence determined by the controller according to some embodiment of the invention.

FIG. 7 is a schematic of the relationship between a terminal cost and control law and the optimal cost and control sequence determined by the controller according to some embodiment of the invention. Some embodiments design the terminal cost and terminal control law such that the regulation error between the performance outputs and corresponding setpoints is locally asymptotically stable.

The MPC determines the optimal control input sequence and associated cost over a prediction horizon of length N steps. However, some embodiments guarantee that the system is locally asymptotically stable over an infinite horizon 705, that is from time step k=0 until k=∞. Because the MPC only determines the optimal control input sequence between k=0 and k=N−1 710, a terminal cost and control law are used to describe and to influence how the system dynamics evolve from k=N until k=∞ 715.

The complete MPC finite horizon optimal control problem can be given by $$\min_{U(t)} \left\| \begin{bmatrix} \xi(N) \\ r(N) \end{bmatrix} \right\|_P^2 + \sum_{k=0}^{N-1} \|\bar{z}(k|t)\|_{Q_2}^2 + \|\bar{u}(k|t)\|_R^2 \quad (11)$$

s.t.

$\xi(k+1|t) = A_\xi \xi(k|t) + B_\xi \bar{u}(k|t)$ $r(k+1|t) = A_r r(k|t)$ $\bar{y}(k|t) = C_\xi \xi(k|t)$ $\bar{z}(k|t) = E_\xi \xi(k|t) - E_r r(k|t)$ $\bar{y}_{min} \leq \bar{y}(k|t) \leq \bar{y}_{max}, k = 0, \ldots, N_c$ $\bar{u}_{min} \leq \bar{u}(k|t) \leq \bar{u}_{max}, k = 1, \ldots, N_u$ $\bar{u}(k|t) = K \begin{bmatrix} \xi(k|t) \\ r(k|t) \end{bmatrix}, k = N_u, \ldots, N-1$ $\xi(0|t) = \xi(t)$ $r(0|t) = r(t)$ where P is the terminal cost weight and K is the terminal gain. In order to determine P and K, some embodiments construct the system $\bar{x}(k+1) = \bar{A}_{pr} \bar{x}(k) + \bar{B}_{pr} \bar{u}(k),$ $\bar{z}(k) = \bar{E}_{pr} \bar{x}(k).$  (12)

where $\xi(k) = [x(k)' \ w(k)' \ x_u(k)' \ x_d(k)']'$, $r(k) = x_r(k)$, $$\bar{x} = \begin{bmatrix} \xi \\ r \end{bmatrix}, \bar{A}_{pr} = \begin{bmatrix} A_\xi & 0 \\ 0 & A_r \end{bmatrix}, \bar{B}_{pr} = \begin{bmatrix} B_\xi \\ 0 \end{bmatrix},$$

and $\bar{E}_{pr} = [E_\xi - E_r]$. The system of (12) is not fully observable and not fully controllable because the controller cannot, in general, modify the reference or the disturbance, and the optimal cost does not depend on the absolute reference and output values but only on their difference. Accordingly, some embodiments apply an observability decomposition via an appropriate change of coordinates T, $x_{obs} = Tx, \ x_{obs} = [x_o^T \ x_{no}^T]^T$ and $$x_{obs}(k+1) = \begin{bmatrix} A_o & 0 \\ A_{no,o} & A_{no} \end{bmatrix} \begin{bmatrix} x_o(k) \\ x_{no}(k) \end{bmatrix} + \begin{bmatrix} B_o \\ B_{no} \end{bmatrix} u(k), \quad (14)$$

$$z(k) = [E_o \ 0] \begin{bmatrix} x_o(k) \\ x_{no}(k) \end{bmatrix},$$

where $x_{no}$ are the coordinates of the state vector with respect to a basis of the unobservable subpace, $x_o$ are the coordinates of the state vector with respect to a basis of the observable subpace, and the pair $(A_o, E_o)$ is observable. The subscript o is used to refer to the observable subspace. Then, the terminal gain $K = [K_o \ 0]T$ and terminal cost weight $$P = T' \begin{bmatrix} P_o & 0 \\ 0 & 0 \end{bmatrix} T$$

where $K_o = -(B_o^T P_o B_o + R)^{-1} B_o^T P_o A_o$  (15)

and $P_o$ is the solution of the Riccati equation $P_o = E_o^T Q_z E_o + A_o^T P_o A_o - A_o^T P_o B_o (B_o^T P_o B_o + R)^{-1} B_o^T P_o A_o$  (16)

The transformation matrix T is used to transform $K_o$ and $P_o$ to the coordinates of the original state vector (12). Moreover, the solution $P_o$ is assumed to exist; this ensures that for the MPC controller that solves (11), $\lim_t Pz(t) P=0$, and the tracking error z(t) is stable. Furthermore, if $A_\xi$, $A_r$ (10) do not share unstable eigenvalues such that the eigenvectors images through $E_\xi$ and $E_r$ (10) share a subspace, there exists $\xi_{eq} \in ^{dim \ A_\xi}$ with $P\xi_{eq} \ P < \infty$ such that $\lim_t P\xi(t) - P = 0$.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of a vapor compression system (VCS), comprising:
    determining, in response to receiving at least one value of a setpoint, values of measured outputs of the operation of the VCS, the measured outputs including at least one performance output controlled according to the value of the setpoint and at least one constrained output controlled to satisfy constraints independent from the value of the setpoint;
    determining states of the VCS using an estimator model of the VCS defining a relationship between the states of the VCS, control inputs and controlled outputs, such that a difference between outputs predicted using the estimator model and the measured outputs asymptotically approaches zero, wherein the states of the VCS include a main state representing the operation of the VCS and an auxiliary state representing the effect of unknown disturbances on each measured output of the VCS;
    determining an estimator relationship between the control inputs, measured disturbances, the measured outputs, and the main states of the VCS;
    augmenting the estimator relationship with p auxiliary states to produce the estimator model, wherein p is a number of the measured outputs, and wherein the auxiliary states represent an aggregate effect of the unknown disturbances and uncertainties on the measured outputs at a steady operating condition of the VCS; and
    determining control inputs for controlling the operation of the VCS using a prediction model defining a relationship between the states of the VCS, the control inputs, the performance and constrained outputs, and the value of the setpoint, such that the constrained output satisfies the constraints, and a difference between the performance output and the value of the setpoint asymptotically approaches zero; and
    controlling the operation of the VCS according to the control inputs, wherein steps of the method are performed by a processor.

2. The method of claim 1, wherein the determining the state comprises for a current time step of the control:
    determining the states of the VCS based on the control inputs and the measured outputs determined for a previous time step of the control;
    predicting outputs of the VCS using the state and the estimator model;
    determining an error between the predicted and the measured outputs of the VCS;
    determining a state correction according to the error; and
    updating the states of the VCS with the state correction.

3. The method of claim 2, further comprises:
    determining the state correction by mapping the error between the predicted and the measured outputs of the VCS to the combined physical and auxiliary state vector using a predetermined matrix of dimension (n+p)×p where n is the dimension of the physical state vector, and p is the dimension of the auxiliary state vector and the measured output vector.

4. The method of claim 1, further comprising:
    determining an estimator gain using the estimator model such that a time-based performance of the estimator is asymptotically stable, wherein an error between the predicted output and measured output asymptotically approaches zero; and
    applying the estimator gain to the error between the predicted output and measured output to iteratively update the states of the VCS.

5. The method of claim 1, further comprising:
    determining a prediction relationship between the main states of the VCS, the control inputs, the measured disturbances, the measured outputs, and the value of the setpoint, wherein the measured disturbances and the value of the setpoint are defined as additional states of the model; and
    augmenting the prediction relationship with the auxiliary states in the estimator model to produce the prediction model.

6. The method of claim 1, wherein the state is determined iteratively at each estimation time interval, wherein the control inputs are determined at each control time interval, and wherein the estimation time interval is less than or equal to the control time interval.

7. The method of claim 1, wherein determining control inputs comprises:
    solving a constrained optimization problem such that a cost function representing the operation of the VCS according to the prediction model is minimized to produce a sequence of control inputs over a prediction horizon; and
    selecting the first element of the sequence of control inputs as the control inputs.

8. The method of claim 7, wherein the cost function includes a discrete sum of a first term and a second term over the prediction horizon, wherein the first term penalizes a change in the control inputs between control time intervals, and the second term penalizes an error between the performance output and the value of the setpoint, and wherein the cost function includes a terminal cost capturing a cost of operating the system for infinite time.

9. The method of claim 8, further comprising:
    determining the terminal cost by solving a linear quadratic optimal control problem for an observable component of the prediction model.

10. The method of claim 1, wherein the constrained outputs includes one or a combination of a discharge temperature of a compressor, a discharge superheat temperature of the compressor, a temperature of an evaporator coil, and a temperature of the condenser coil.

11. The method of claim 1, wherein the performance outputs includes one or combination of a temperature of an air in a controlled space, and a discharge temperature of a compressor.

12. The method of claim 1, wherein the VCS includes multiple evaporating and condensing heat exchanger units.

13. The method of claim 1, wherein a number of the control inputs is greater than a number of the performance outputs.

14. A controller for controlling an operation of a vapor compression system (VCS), comprising:
  an estimator for determining iteratively states of the VCS, such that a difference between outputs of the operation of the VCS predicted using the states and measured outputs of the operation of the VCS asymptotically approaches zero; and
  a predictive controller for determining control inputs for the operation of the VCS using the states of the VCS and for controlling the operation of the VCS according to the control inputs, wherein determining control inputs comprises:
  solving a constrained optimization problem such that a cost function representing the operation of the VCS according to the prediction model is minimized to produce a sequence of control inputs over a prediction horizon; and
selecting the first element of the sequence of control inputs as the control inputs;
  wherein the cost function includes a discrete sum of a first term and a second term over the prediction horizon, wherein the first term penalizes a change in the control inputs between control time intervals, and the second term penalizes an error between the performance output and the value of the setpoint, and wherein the cost function includes a terminal cost capturing a cost of operating the system for infinite time; and
  determining the terminal cost by solving a linear quadratic optimal control problem for an observable component of the prediction model.

15. The controller of claim 14, further comprising:
a processor, for determining, in response to receiving at least one value of a setpoint, values of the measured outputs of the operation of the VCS, the measured outputs including at least one performance output controlled according to the value of the setpoint and at least one constrained output controlled to satisfy constraints independent from the value of the setpoint.

16. The controller of claim 15,
wherein the estimator determines the states of the VCS using an estimator model of the VCS defining a relationship between the states of the VCS, control inputs and controlled outputs, such that a difference between outputs predicted using the estimator model and the measured outputs asymptotically approaches zero, wherein the states of the VCS include a main state representing the operation of the VCS and an auxiliary state representing the effect of unknown disturbances on each measured output of the VCS; and
wherein the predictive controller determines the control inputs for controlling the operation of the VCS using a prediction model defining a relationship between the states of the VCS, the control inputs, the performance and constrained outputs, and the value of the setpoint, such that the constrained output satisfies the constraints, and a difference between the performance output and the value of the setpoint asymptotically approaches zero.

17. A vapor compression system (VCS), comprising:
a set of components for controlling an environment according to a value of a setpoint, the set of components includes:
  a compressor having a variable speed for compressing and pumping a refrigerant;
  an expansion valve for providing an adjustable pressure drop between a high-pressure and a low-pressure portions of the VCS; and
  a heat exchanger having a variable speed fan for adjusting an air-flow rate through the heat exchanger;
a sensor for determining values of measured outputs of an operation of the VCS, the measured outputs including at least one performance output controlled according to the value of the setpoint and at least one constrained output controlled to satisfy constraints independent from the value of the setpoint; and
a controller for controlling an operation of at least some of the components of the VCS, the controller comprising:
  an estimator for determining iteratively states of the VCS, such that a difference between outputs of the operation of the VCS predicted using the states and the measured outputs of the operation of the VCS asymptotically approaches zero; and
  a predictive controller for determining control inputs for the operation of at least some of the components of the VCS and for controlling the operation of the VCS according to the control inputs, wherein determining control inputs comprises:
    solving a constrained optimization problem such that a cost function representing the operation of the VCS according to the prediction model is minimized to produce a sequence of control inputs over a prediction horizon; and
selecting the first element of the sequence of control inputs as the control inputs;
wherein the cost function includes a discrete sum of a first term and a second term over the prediction horizon, wherein the first term penalizes a change in the control inputs between control time intervals, and the second term penalizes an error between the performance output and the value of the setpoint, and wherein the cost function includes a terminal cost capturing a cost of operating the system for infinite time; and
  determining the terminal cost by solving a linear quadratic optimal control problem for an observable component of the prediction model.

18. The VCS of claim 17, wherein the estimator determines the states of the VCS using an estimator model of the VCS defining a relationship between the states of the VCS, control inputs and controlled outputs, such that a difference between outputs predicted using the estimator model and the measured outputs asymptotically approaches zero, wherein the states of the VCS include a main state representing the operation of the VCS and an auxiliary state representing the effect of unknown disturbances on each measured output of the VCS; and wherein the predictive controller determines the control inputs for controlling the operation of the VCS using a prediction model defining a relationship between the states of the VCS, the control inputs, the performance and constrained outputs, and the value of the setpoint, such that the constrained output satisfies the constraints, and a difference between the performance output and the value of the setpoint asymptotically approaches zero.

19. A method for controlling an operation of a vapor compression system (VCS), comprising:
  determining, in response to receiving at least one value of a setpoint, values of measured outputs of the operation of the VCS, the measured outputs including at least one performance output controlled according to the value of the setpoint and at least one constrained output controlled to satisfy constraints independent from the value of the setpoint;

determining states of the VCS using an estimator model of the VCS defining a relationship between the states of the VCS, control inputs and controlled outputs, such that a difference between outputs predicted using the estimator model and the measured outputs asymptotically approaches zero, wherein the states of the VCS include a main state representing the operation of the VCS and an auxiliary state representing the effect of unknown disturbances on each measured output of the VCS;

determining control inputs for controlling the operation of the VCS using a prediction model defining a relationship between the states of the VCS, the control inputs, the performance and constrained outputs, and the value of the setpoint, such that the constrained output satisfies the constraints, and a difference between the performance output and the value of the setpoint asymptotically approaches zero, wherein determining control inputs comprises:

solving a constrained optimization problem such that a cost function representing the operation of the VCS according to the prediction model is minimized to produce a sequence of control inputs over a prediction horizon; and selecting the first element of the sequence of control inputs as the control inputs;

wherein the cost function includes a discrete sum of a first term and a second term over the prediction horizon, wherein the first term penalizes a change in the control inputs between control time intervals, and the second term penalizes an error between the performance output and the value of the setpoint, and wherein the cost function includes a terminal cost capturing a cost of operating the system for infinite time; and determining the terminal cost by solving a linear quadratic optimal control problem for an observable component of the prediction model; and controlling the operation of the VCS according to the control inputs, wherein steps of the method are performed by a processor.

* * * * *